(12) United States Patent
Nagata

(10) Patent No.: US 7,710,401 B2
(45) Date of Patent: May 4, 2010

(54) PORTABLE TERMINAL DEVICE WITH POINTING DEVICE

(75) Inventor: Hideaki Nagata, Tokyo (JP)

(73) Assignee: NEC Corporation, Tokyo (JP)

( * ) Notice: Subject to any disclaimer, the term of this patent is extended or adjusted under 35 U.S.C. 154(b) by 1037 days.

(21) Appl. No.: 10/732,368

(22) Filed: Dec. 11, 2003

(65) Prior Publication Data

US 2004/0121800 A1    Jun. 24, 2004

(30) Foreign Application Priority Data

Dec. 17, 2002  (JP)  ............................. 2002-365459

(51) Int. Cl.
G06F 3/041    (2006.01)

(52) U.S. Cl. ..................... 345/173; 345/169; 715/825

(58) Field of Classification Search ......... 345/156–158, 345/856, 169, 173; 715/859, 864, 856, 825–829
See application file for complete search history.

(56) References Cited

U.S. PATENT DOCUMENTS

| | | | | |
|---|---|---|---|---|
| 5,546,521 A | * | 8/1996 | Martinez | 715/711 |
| 6,839,101 B2 | * | 1/2005 | Shima | 349/58 |
| 6,865,719 B1 | * | 3/2005 | Nicholas, III | 715/856 |
| 6,938,219 B2 | * | 8/2005 | Al-Azzawe et al. | 715/854 |
| 6,947,896 B2 | * | 9/2005 | Hanson | 704/270 |
| 2002/0085045 A1 | | 7/2002 | Vong | |
| 2002/0190975 A1 | * | 12/2002 | Kerr | 345/211 |
| 2005/0216866 A1 | * | 9/2005 | Rosen et al. | 715/856 |

FOREIGN PATENT DOCUMENTS

| | | | |
|---|---|---|---|
| GB | 2297662 | A | 7/1996 |
| JP | 60-205739 | A | 10/1985 |
| JP | 62-233823 | A | 10/1987 |
| JP | 11-65767 | A | 3/1999 |
| JP | 11-177709 | A | 7/1999 |
| JP | 11-224109 | A | 8/1999 |
| JP | 2000-250699 | A | 9/2000 |
| JP | 2000-349888 | A | 12/2000 |
| JP | 2001-43170 | A | 2/2001 |
| JP | 2002-16720 | A | 1/2002 |
| WO | 02/13001 | A2 | 2/2002 |
| WO | 02/052540 | A1 | 7/2002 |

* cited by examiner

*Primary Examiner*—Richard Hjerpe
*Assistant Examiner*—Kimnhung Nguyen
(74) *Attorney, Agent, or Firm*—Sughrue Mion, PLLC

(57) ABSTRACT

A mobile phone includes a pointing device and an activation mark in the vicinity of the display section. When a user moves a pointer on the display section to a position indicating the mark and operates the decision key, a predetermined action is activated. The number of icons that can be displayed on the display section of the mobile phone is limited. Therefore, in order to easily activate a number of actions of the mobile phone, the aforementioned mark is utilized.

7 Claims, 7 Drawing Sheets

PORTABLE TERMINAL DEVICE WITH POINTING DEVICE

BACKGROUND OF THE INVENTION

1. Field of the Invention

The present invention relates to a portable terminal device, and specifically relates to a portable terminal device in which an action is selected and activated by operating a pointer with a pointing device.

2. Description of the Related Prior Art

When a user selects and activates an action of a mobile phone, the following operations are required. First, an operation selection key is pressed to select an operation selection mode and display a table in which names of actions are registered. The displayed names of actions are scrolled to be sequentially moved. A decision key is pressed for the name of a desired action. In the case where the mobile phone includes a lot of action items, the user must repeat the scroll operation many times to display the name of the desired action. In order to avoid such a troublesome operation, the Japanese Patent Laid-Open Publication No. 2000-349888 discloses a mobile phone which can display an icon in a display section. The user can easily activate the desired action by clicking the displayed icons. However, the display section of the mobile phone is much smaller than a display of a home computer or the like. Accordingly, the number of icons which can be displayed in the display section of the mobile phone is limited.

SUMMARY OF THE INVENTION

A portable terminal device of an embodiment of the present invention includes a pointing device, and further includes a display section, an activation mark formed in the vicinity of the display section, and a controller which controls activation of a predetermined action when a pointer on the display section is at a position indicating the action activation mark. The portable terminal device can include a plurality of activation marks and set predetermined actions so as to correspond to the respective activation marks. This controller can activate the predetermined action when the pointer on the display section is at the position indicating the activation mark and a predetermined key is operated. Alternatively, this controller can activate the predetermined action when the pointer on the display section is at the position indicating the activation mark and the predetermined key is not operated for a certain period of time. The above display section can display an icon. A portable terminal device of another embodiment can further include a light-emitting element formed in the vicinity of the display section, means for lighting the light-emitting element when a message from the other end is received, and means for displaying the message on the display section when the pointer is located at a position indicating the lit light-emitting element.

A program of an embodiment of the present invention is a program which causes a computer to execute a predetermined action of the portable terminal device and includes the following processes: to detect a predetermined operation of a decision key; to detect a position of a pointer on a display section; to judge whether the operation of the decision key corresponds to the position of the pointer; and to activate the predetermined action related to the position of the pointer when the operation of the decision key corresponds to the position of the pointer.

In the portable terminal device of the present invention, a desired action can be easily activated among a number of actions thereof.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Figure 1:
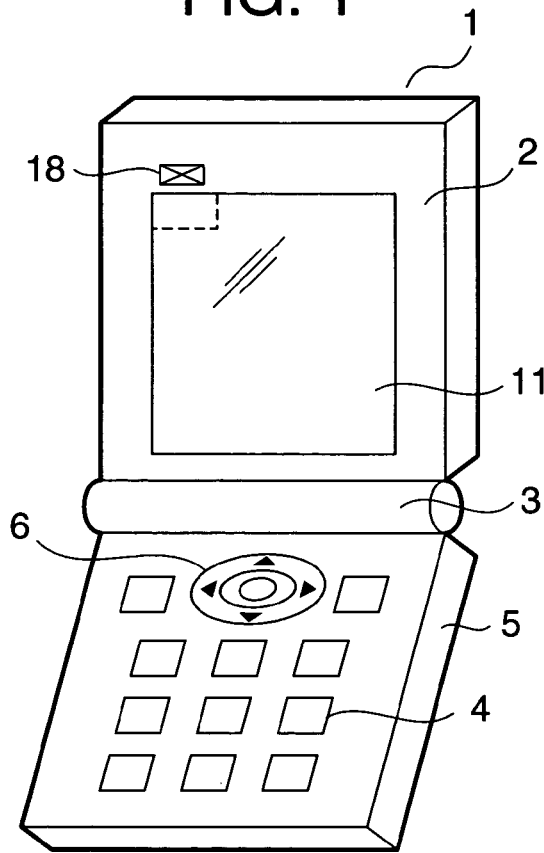
FIG. 1 is a perspective view of an embodiment of a portable terminal device.

Portable terminal devices to which the present invention is applied are a mobile phone, a Personal Handyphone System (PHS), a Personal Digital Assistance (PDA), and the like. FIG. 1 shows an example of a folding type mobile phone to which the present invention is applied. In this mobile phone 1, a hinge section 3 couples an upper case 2 and a lower case 5. The upper case 2 includes a display section 11 and an activation mark 18 placed in the vicinity of the display section 11. The lower case 5 includes a pointing device 13 and an entry key section 4. In this embodiment, the pointing device is a slide type (for example, Japanese Patent Laid-Open No. 9(1997)-134248). Other pointing devices are a trackball type (for example, Japanese Patent Laid-Open No. 2001-16635), a finger moving type (for example, Japanese Patent Laid-Open Nos. 2002-62983 and 8(1996)-115158), and the like.

Figure 2:
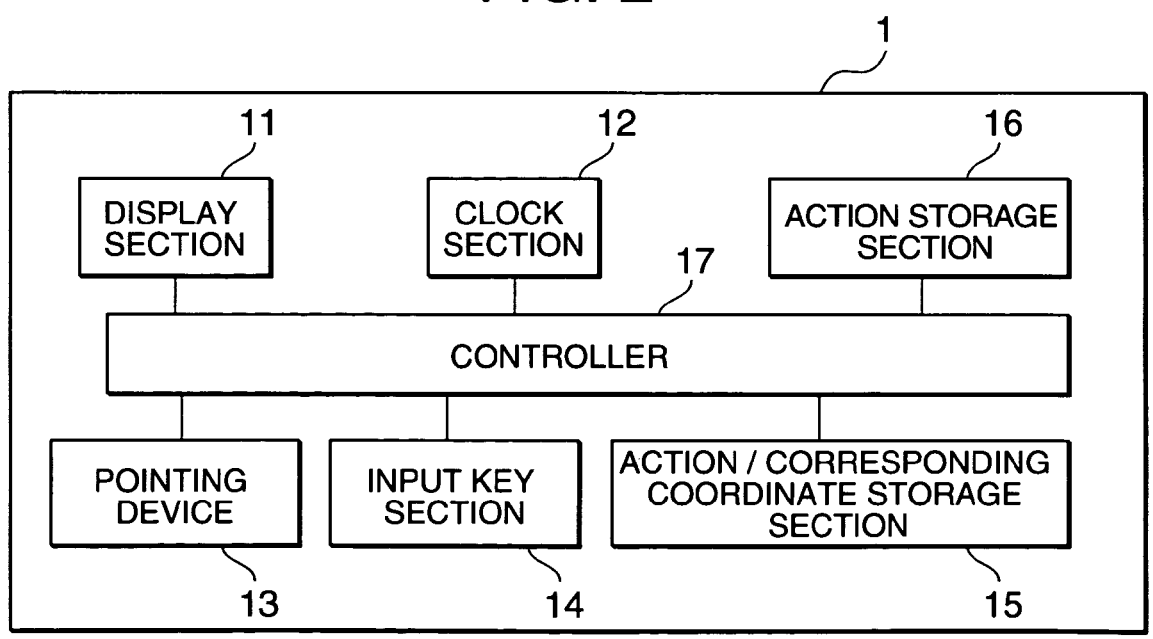
FIG. 2 is a block diagram of the embodiment of the portable terminal device.

Referring to FIG. 2, the aforementioned mobile phone 1 includes a display section 11, a clock section 12, the pointing device 13, an entry key section 14, an action/corresponding coordinate storage section 15, an action storage section 16, and a controller 17. The pointing device 13 controls movement of a pointer (i.e., a cursor) on a screen of the display section 11. The action/corresponding coordinate storage section 15 stores a correspondence relationship between each action of the mobile phone 1 and a position (coordinates) of the pointer on the display section 11 or an icon displayed on the display section 11. The action storage section 16 stores an action program, data, and the like corresponding to each action.

Figure 3:
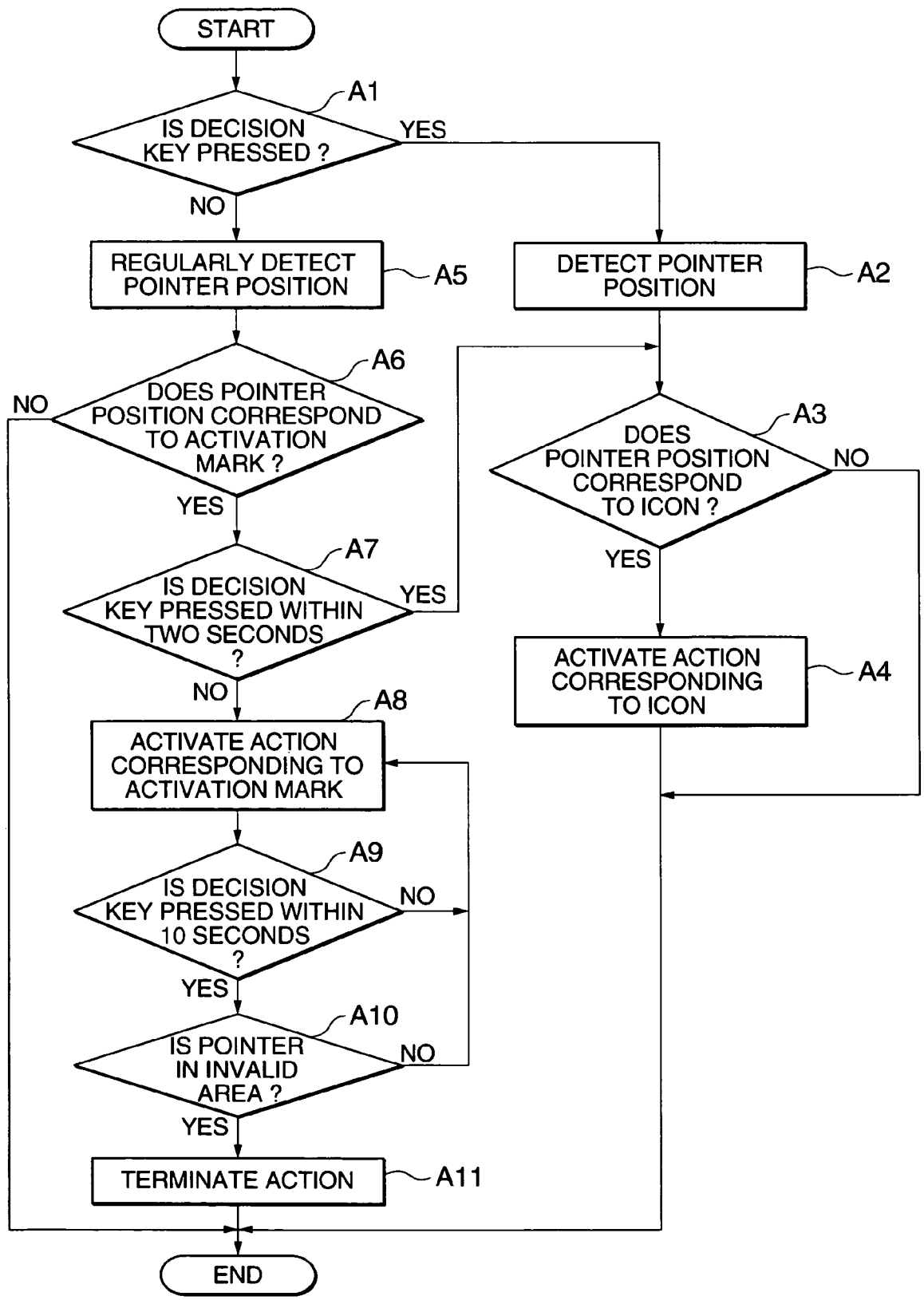
FIG. 3 shows an example of a flow that an action of the portable terminal device is activated.

Referring to FIG. 3, an example of a behavior of the mobile phone 1 is shown. The mobile phone 1 repeats the behavior shown in FIG. 3. First, the controller 17 judges whether the decision key of the pointing device 13 is pressed (A1). When the decision key is pressed (YES in A1), the controller 17 detects the position of the pointer (A2). Next, the controller 17 searches for the action/corresponding coordinate storage section 15 (A3). When an icon is displayed at the detected position of the pointer (YES in A3), the controller 17 activates an action corresponding to the icon (A4) On the contrary, when the decision key is not pressed (NO in A1), the controller 17 detects the position of the pointer on the display section 11 regularly (for example, each one second) (A5), and judges whether the pointer on the display section 11 is at the position indicating the activation mark 18 (A6). When the pointer is at the position indicating the activation mark 18, the controller 17 judges whether the decision key is pressed within a certain period of time (for example, within two seconds) (A7). When the decision key is pressed within the certain period of time (YES in A7), the processing of A3 is performed. When the decision key is not pressed within the certain period of time, the controller 17 activates an action corresponding to the activation mark 18 (A8).

The process after A8 is a process to terminate the activated action. The controller 17 then judges whether the decision key is pressed within a predetermined period of time (for example, within 10 seconds) (A9). When the decision key is pressed within the predetermined period of time, the controller 17 detects the position of the pointer and judges whether the pointer is in an invalid area (A10). The invalid area is an area on the display section excluding the position where the pointer points to the activation mark 18 and a processing area of the activated action. The processing area is an area on the display section 11, for example, to select YES or NO or select a particular item by the pointer or the cursor. When the pointer is in the invalid area, the controller 17 terminates the activated action (A11).

Figure 4A:
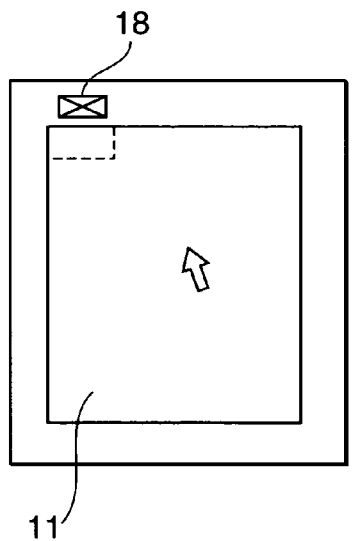
FIGS. 4A to 4E show display examples of a display section of the portable terminal device.
Figure 4B:
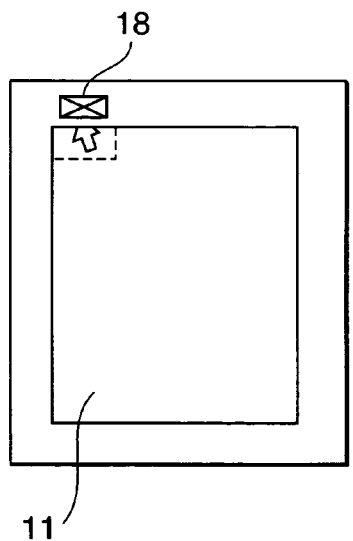
Figure 4C:
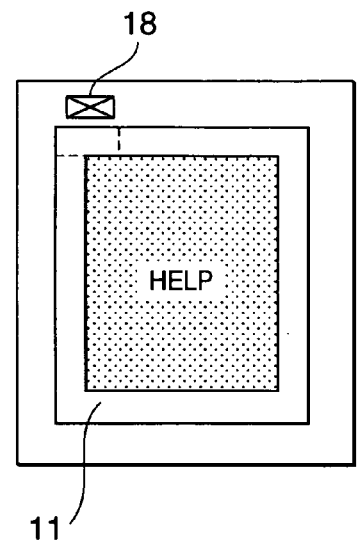
Figure 4D:
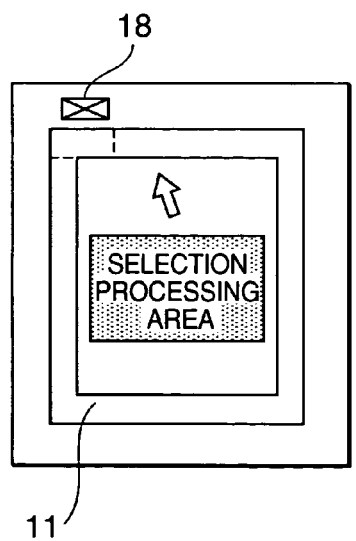
Figure 4E:
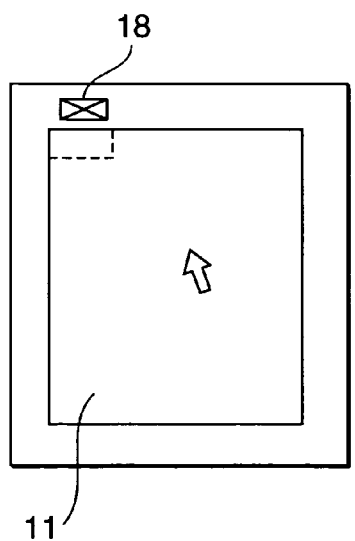

Referring to FIGS. 4A to 4D, display examples of the display section 11 in the above behavior example are shown. In FIG. 4A, the pointer on the display section 11 does not point to the action activation mark 18 (NO in A6). In FIG. 4B, the pointer on the display section 11 points to the activation mark 18 (YES in A6). When the pointer is in the area indicated by a dotted line in FIG. 4B, the pointer is judged to point to the activation mark 18. In FIG. 4C, an action of help display is being activated (A8). In FIG. 4D, the action corresponding to the activation mark 18 is being activated, and the pointer is in the aforementioned invalid area (YES in A10). In FIG. 4E, the action is terminated (A11). A setting condition is available., in which termination of the action requires an operation of the decision key.

In the embodiment shown in FIG. 3, the activation of the action corresponding to the activation mark 18 does not require pressing the decision key. On the contrary, the activation of the action corresponding to the icon displayed on the display section 11 requires pressing the decision key. In the case where the position of the pointer on the display section 11 which points to the activation mark 18 is on an icon, a user can activate a desired action if the method of operating the decision key to activate the action corresponding to the activation mark 18 is different from that to activate the action corresponding to the icon. The examples of the action corresponding to the activation mark 18 are the action of help display, an action to return to the previous screen, an action to display another icon, and the like. The user can arbitrarily select and set the action corresponding to the activation mark 18 among various actions of this mobile phone 1.

Figure 5:
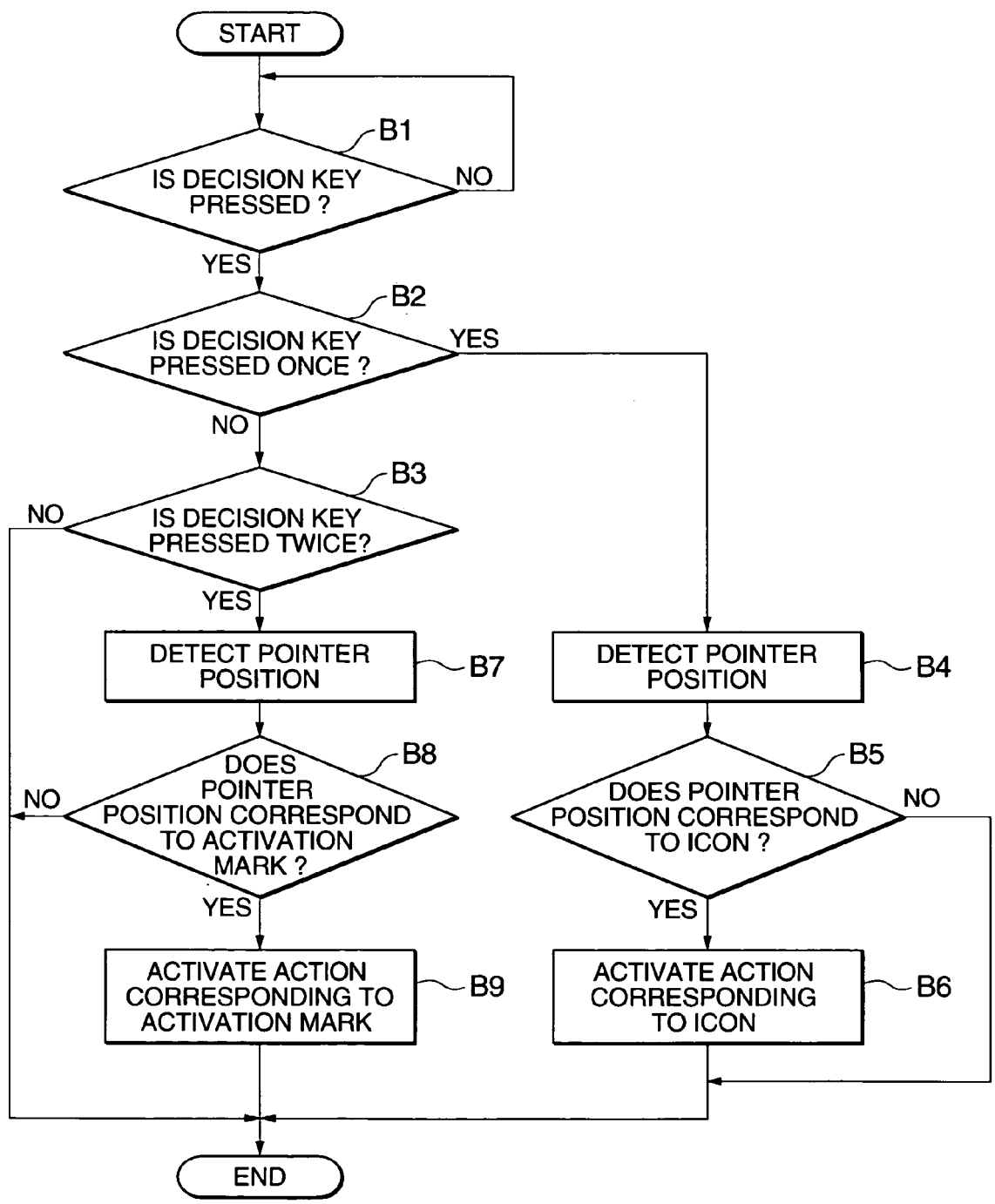
FIG. 5 shows another example of the flow that the action of the portable terminal device is activated.

Referring to FIG. 5, another example of the behavior of the mobile phone 1 is shown. First, the controller 17 judges whether the decision key of the pointing device 13 is pressed (B1). When the decision key is pressed, the controller 17 judges whether the number of times that the decision key is pressed is one (single click) or two (double click) (B2, B3). When the number of times that the decision key is pressed is one (single click), the controller 17 detects the position of the pointer on the display section 11 (B4). If the pointer is in the area of an icon on the display section 11 (YES in B5), the controller 17 activates an action corresponding to the icon (B6). On the contrary, when the number of times that the decision key is pressed is two (double click), the controller 17 detects the position of the pointer on the display section 11 (B7). If the pointer is at the position indicating the activation mark 18 on the display section 11 (YES in B8), the controller 17 activates the action corresponding to the activation mark 18 (B9). Also in this embodiment, the operations to activate the actions corresponding to the icon and the activation mark 18 are different from each other.

Figure 6:
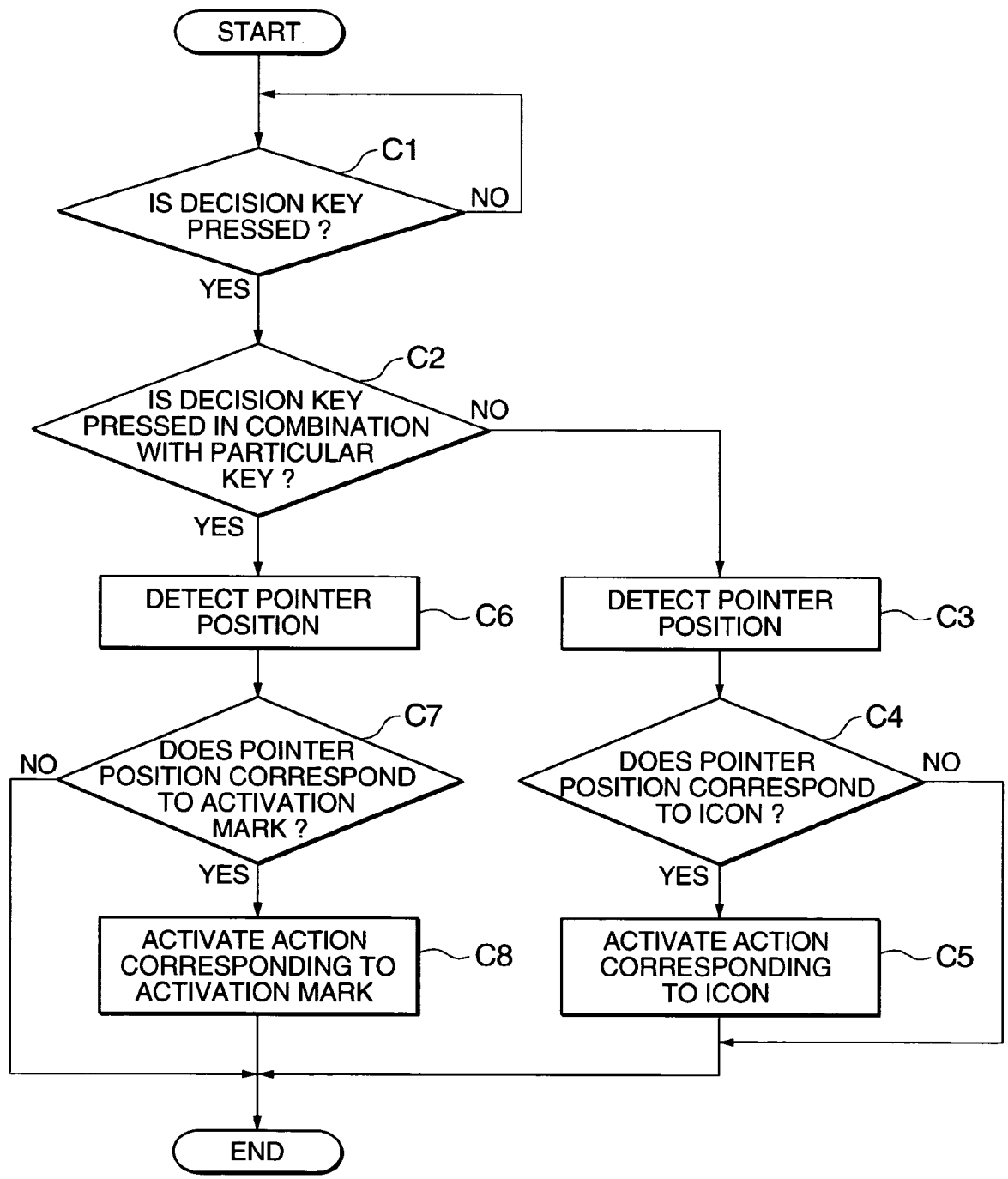
FIG. 6 shows still another example of the flow that the action of the portable terminal device is activated.

Referring to FIG. 6, still another example of the behavior of the mobile phone 1 is shown. First, the controller 17 judges whether the decision key of the pointing device 13 is pressed (C1). When the decision key is pressed, the controller 17 judges whether the decision key is pressed together with another particular key (C2). The decision key and the particular key are judged to be pressed together if these keys are pressed within a predetermined short period of time. When only the decision key is pressed, the controller 17 detects the position of the pointer on the display section 11 (C3). If the pointer is in the area of an icon on the display section 11 (YES in C4), the controller 17 activates an action corresponding to the icon (C5). On the contrary, when the decision key and the particular key are pressed together (YES in C2), the controller 17 detects the position of the pointer (C6). If the pointer is at the position on the display section 11 indicating the activation mark 18 (YES in C7), the controller 17 activates the action corresponding to the activation mark 18 (C8). Also in this embodiment, the operations to activate the actions corresponding to the icon and the activation mark 18 are different from each other.

Figure 7:
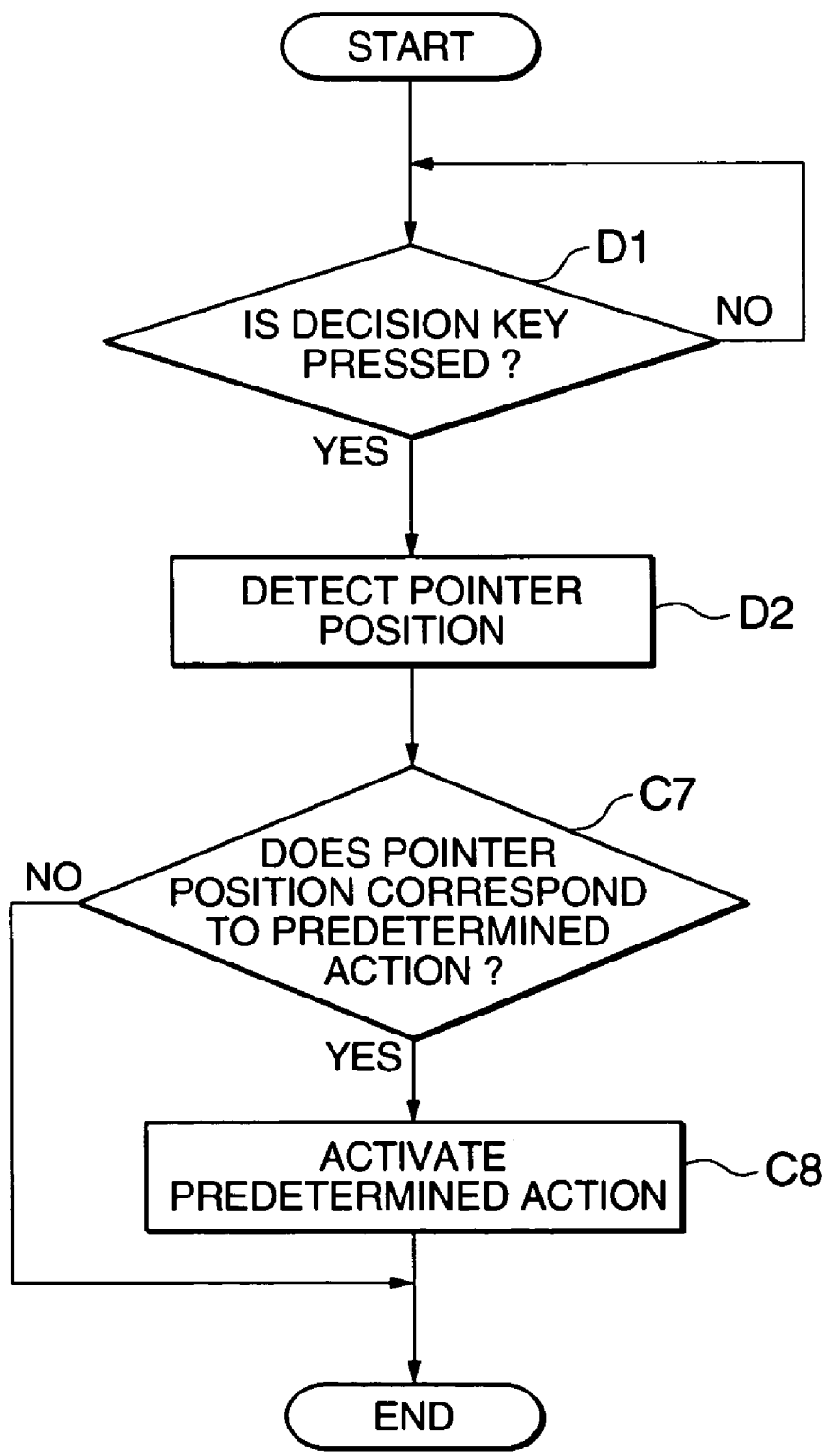
FIG. 7 shows still another example of the flow that the action of the portable terminal device is activated.

Referring to FIG. 7, still another example of the behavior of the mobile phone 1 is shown. In this example, the area in which an icon on the display section 11 is placed and the position where the pointer points to the activation mark 18 are set so as not to overlap each other. Accordingly, the operations to activate the actions corresponding to each icon and the activation mark 18 can be the same. First, the controller 17 judges whether the decision key of the pointing device 13 is pressed (D1). When the decision key is pressed, the controller 17 detects the position of the pointer on the display section 11 (D2). In the case where an action corresponding to the detected position is stored (YES in D3), the controller 17 activates that action (D4).

Figure 8:
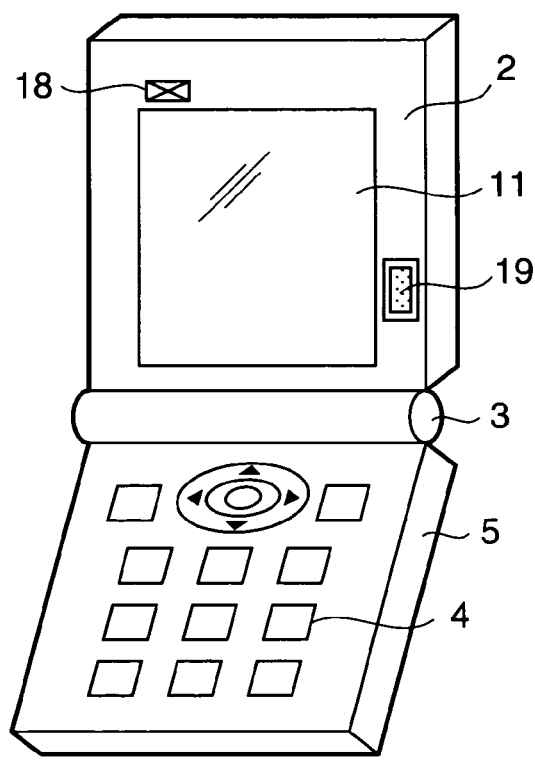
FIG. 8 is a perspective view of another embodiment of the portable terminal device.

Referring to FIG. 8, the mobile phone 1 includes an LED 19 in the vicinity of the display section 11, an LED lighting controller which lights the LED when a message is received, and a received message storage section. When a user moves the pointer on the display section 11 to the position indicating the LED 19 and operates the decision key while the LED 19 is lit, a received message stored in the received message storage section can be displayed on the display section 11. This LED 19 can be utilized as the aforementioned activation mark 18.

Figure 9:
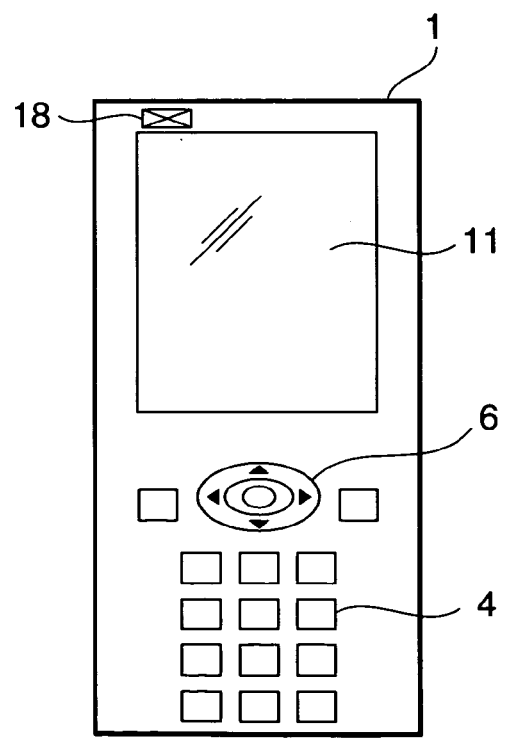
FIG. 9 is a perspective view of still another embodiment of the portable terminal device.

Referring to FIG. 9, another embodiment of the mobile phone is shown. This mobile phone is provided with a single case.

In the aforementioned mobile phones, a plurality of the activation marks 18 can be placed in the vicinity of the display section 11, and further placed together with the LED 19.

Referring to FIGS. 1, 4A-4E, 8 and 9, the activation mark 18 may be formed adjacent to the display section 11.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A portable terminal device including a pointing device, comprising:
   a display section disposed in a case;
   an activation mark formed on the case adjacent to the display section;
   an icon displayed in the display section;
   a pointing device which judges a pointer position in the display section when a press of a decision key is detected;
   a storage section storing a corresponding relationship between an action and the position in the display section where the pointer indicates the activation mark and/or the icon; and
   a controller which searches for the action corresponding to the icon from the storage section and activates the searched action in case of a press of the decision key is detected in the state that the pointer is in the position which indicates the icon,
   searches for the action corresponding to the activation mark from the storage section and activates the searched action in case of a press of the decision key is not detected within a predetermined period in the state that the pointer is in the position which indicates the activation mark,
   searches for the action corresponding to the icon from the storage section and activates the searched action in case of a press of the decision key is detected within a predetermined period in the state that the pointer is in the position which indicates both of the icon and the activation mark, and
   searches for the action corresponding to the activation mark from the storage section and activates the searched action in case of a press of the decision key is not detected within a predetermined period in the state that the pointer is in the position which indicates both of the icon and the activation mark.

2. The portable terminal device according to claim 1, further comprising:
   a plurality of activation marks, wherein
   predetermined actions of the portable terminal device are set so as to correspond to the respective activation marks.

3. The portable terminal device according to claim 1, wherein
   the controller searches for the action corresponding to the icon from the storage section and activates a searched action in case of a press of the decision key is detected in the state that the pointer is in the position which indicates the icon, and
   searches for the action corresponding to the activation mark from the storage section and activates the searched section in case of a press of the decision key and another specific key are detected simultaneously in the state that the pointer is in the position which indicates the activation mark.

4. The portable terminal device according to claim 1, wherein
   the controller searches for the action corresponding to the icon from the storage section and activates the searched action in case of a press of the decision key is detected once in the state that the pointer is in the position which indicates the icon,
   searches for the action corresponding to the activation mark from the storage section and activates the searched activation in case of a press of the decision key is detected twice in the state that the pointer is in the position which indicates the activation mark,
   searches for the action corresponding to the icon from the storage section and activates the searched action in case of a press of the decision key is detected once within a predetermined period in the state that the pointer is in the position which indicates both of the icon and the activation mark, and
   searches for the action corresponding to the activation mark from the storage section and activates the searched action in case of a press of decision key is detected twice in the state that the pointer is in the position which indicates both of the icon and the activation mark.

5. The portable terminal device according to claim 1, wherein
   the controller terminates the activated action when the pointer exists in invalid areas and the press of the decision key is detected within a predetermined period after the action corresponding to the activation mark is activated.

6. The portable terminal device according to claim 1, further comprising:
   a light-emitting element formed in the vicinity of the display section;
   means for lighting the light-emitting element when a message from the other end is received; and
   means for displaying the message on the display section when the pointer is located at a position adjacent to the lit light-emitting element.

7. The portable terminal device according to claim 6, wherein
   the light-emitting element can be used as the activation mark.

* * * * *